No. 880,081. PATENTED FEB. 25, 1908.
G. J. KAPLAN.
COMBINED CHURN AND BUTTER WORKER.
APPLICATION FILED AUG. 6, 1906.
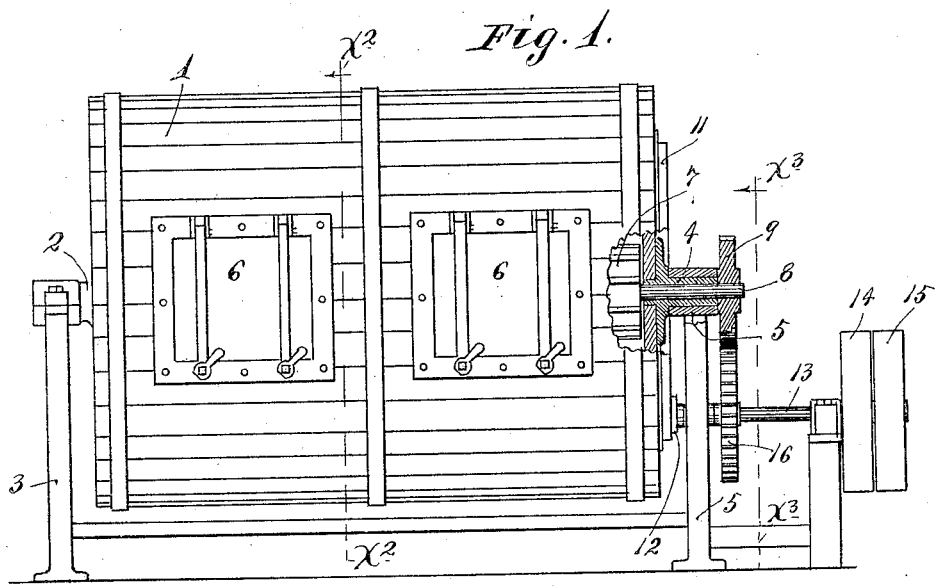
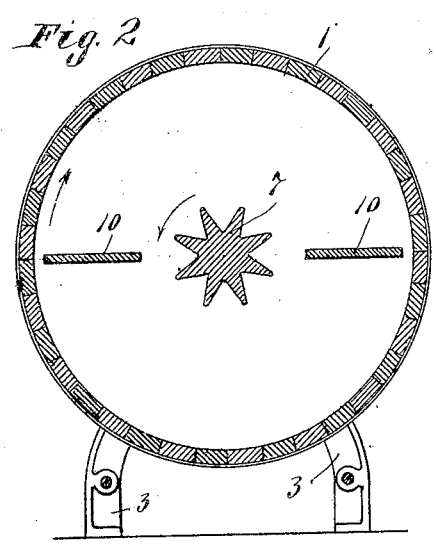 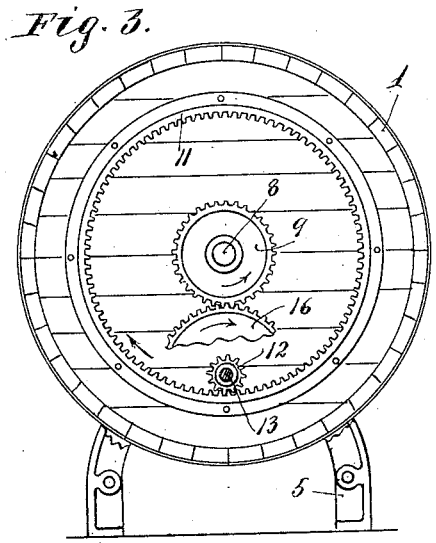
Witnesses.
A. H. Opsahl.
Malie Hoel.
Inventor.
Godfrey J. Kaplan.
By his Attorneys.
Williamson Merchant

UNITED STATES PATENT OFFICE.

GODFREY J. KAPLAN, OF OWATONNA, MINNESOTA, ASSIGNOR, BY DIRECT AND MESNE ASSIGNMENTS, TO PERFECTION CHURN COMPANY, A CORPORATION OF MINNESOTA.

COMBINED CHURN AND BUTTER-WORKER.

No. 880,081.

Specification of Letters Patent.

Patented Feb. 25, 1908.

Application filed August 6, 1906. Serial No. 329,384.

*To all whom it may concern:*

Be it known that I, GODFREY J. KAPLAN, a citizen of the United States, residing at Owatonna, in the county of Steele and State of Minnesota, have invented certain new and useful Improvements in a Combined Churn and Butter-Worker; and I do hereby declare the following to be a full, clear, and exact description of the invention, such as will enable others skilled in the art to which it appertains to make and use the same.

My present invention has for its object to provide a highly efficient and extremely simple combined churn and butterworker, and to this end it consists of the novel devices and combinations of devices hereinafter described and defined in the claims.

The improved machine is illustrated in the accompanying drawings, wherein like characters indicate like parts throughout the several views.

Referring to the drawings, Figure 1 shows the improved machine in side elevation. Fig. 2 is a transverse vertical section taken through the churn on the line $x^2$ $x^2$ of Fig. 1; and Fig. 3 is a transverse vertical section taken on the line $x^3$ $x^3$ of Fig. 1, some parts being broken away.

The numeral 1 indicates the rotary drum of the machine, which drum is horizontally disposed and has fixed heads, and one of which heads is provided with a trunnion 2 that is journaled in a suitable bearing of a bearing bracket 3, while the other head is provided with a hollow trunnion 4 that is journaled in a suitable bearing of a bearing bracket 5. The drum is, as shown, provided with two peripheral openings that are normally closed by tightly clamped doors 6 of the usual or any suitable construction.

Within the drum, extending from one head to the other thereof, and journaled on the axis of the drum, is a large, deeply corrugated so-called "paddle" roller 7. This paddle roller 7, at one end, has a projecting shaft 8 that is extended through the hollow trunnion 4 and is provided at its outer end with a spur gear 9. Also located within the drum and extending from one head to the other thereof, adjacent or near to the shell of the drum, are so-called "lifting" abutments 10. In what I assume to be the best construction of the machine, two of these lifting abutments 10 are employed, and they are located diametrically opposite to each other and are spaced apart slightly from the shell of the drum, so as to permit drainage in the butter working action.

For the purpose of rotating the drum, one head thereof is shown as provided with the usual internal ring gear 11 that meshes with a pinion 12 carried by a counter-shaft 13 mounted in suitable bearings on the frame 5. On the outer end of the shaft 13 is a fixed pulley 14 and a loose pulley 15. The said shaft 13 carried a spur gear 16 that meshes with a spur gear 9 of the roller shaft 8. With the connections described, when the driving belt (not shown) is run onto the pulley 14, the drum and the roller will be rotated in reverse directions, and the said roller will be rotated at a high speed as compared with the speed of the drum. Assuming the drum to be driven in the direction of the arrow marked thereon in Fig. 2, the paddle roller will be driven in the direction of the arrow marked adjacent thereto in the said view. The space between the inner edges of the lifting abutments 10 and the projecting edges of the corrugations or blades of said paddle roller is such that in the butter working action, the butter may be rapidly forced between said roller and the coöperating lifting abutment which is then being moved upward on the rising side of the drum.

In the churning action, the cream will be agitated both by the lifting abutments 10 and by the blades of the paddle roller 7. When one of the lifting abutments is moving upward on the rising side of the drum, the cream will be directed thereby against the blades of the paddle roller, and by the latter will be dashed about within the drum, and the rapid churning action is thereby produced.

In the butter working action, the butter will be raised by the lifting abutment 10 which is moving upward on the rising side of the drum, and will be thereby directed against the paddle roller. The butter thus delivered against the blades of the paddle roller will be cut into strips by the bars and will be forced rapidly between the said roller and the coöperating abutment. The butter thus engaged by the blades of the paddle roller will by each blade be struck a light blow, which is very similar to that produced by a hand operated paddle in the act of working butter by hand. The two lifting abutments will, of course, be brought into action in succession.

The churn would be operative with but one lifting abutment, but the action would not be continuous, and there would be a very considerably waste of time as well as of power. More than two lifting abutments may be employed, but the best results can be obtained by the use of the two lifting abutments arranged diametrically opposite to each other.

By reference particularly to Fig. 2, it will be noted that the butter working devices within the drum, to-wit, the paddle roller 7 and lifting abutments 10, are bi-symmetrically arranged on opposite sides of a plane which intersects the said lifting abutments and the axis of said paddle roller. In view of this arrangement, it is possible to produce both the churning and butter working actions with the drum driven in either direction.

As is well known to persons who have installed machines of this kind, it is some times desirable to rotate the drum in one direction, and sometimes desirable to rotate the drum in the other direction, according to the position which the churn must occupy with respect to certain power shafts from which power is supplied to drive the machine.

The churn illustrated is a single speed drive. So far as the broad idea of this invention is concerned, the churn might have a two speed drive, but I believe that with a churn of this kind, the single speed drive would be found efficient both for the churning and butter working actions.

What I claim is:

1. The combination with a horizontally disposed rotary drum, of a single centrally disposed paddle roller within said drum, a pair of diametrically opposite radially disposed lifting abutments secured within said drum and terminating at their inner edges in close proximity to said roller, and means for rotating said drum in one direction and the said roller in the opposite direction, substantially as described.

2. The combination with a horizontally disposed rotary drum, of a centrally located paddle roller within said drum, a pair of diametrically opposite radially disposed lifting abutments secured within said drum with their outer edges spaced from the shell of the drum and with their inner edges terminating in close proximity to the said roller, and means for rotating said drum in one direction and said roller in the opposite direction, substantially as described.

In testimony whereof I affix my signature in presence of two witnesses.

GODFREY J. KAPLAN.

Witnesses:
S. G. KINNEY,
L. A. DISBROW.